July 6, 1943.  E. G. KESLING  2,323,878
GEAR SHIFTING MECHANISM
Filed March 6, 1940  4 Sheets-Sheet 1
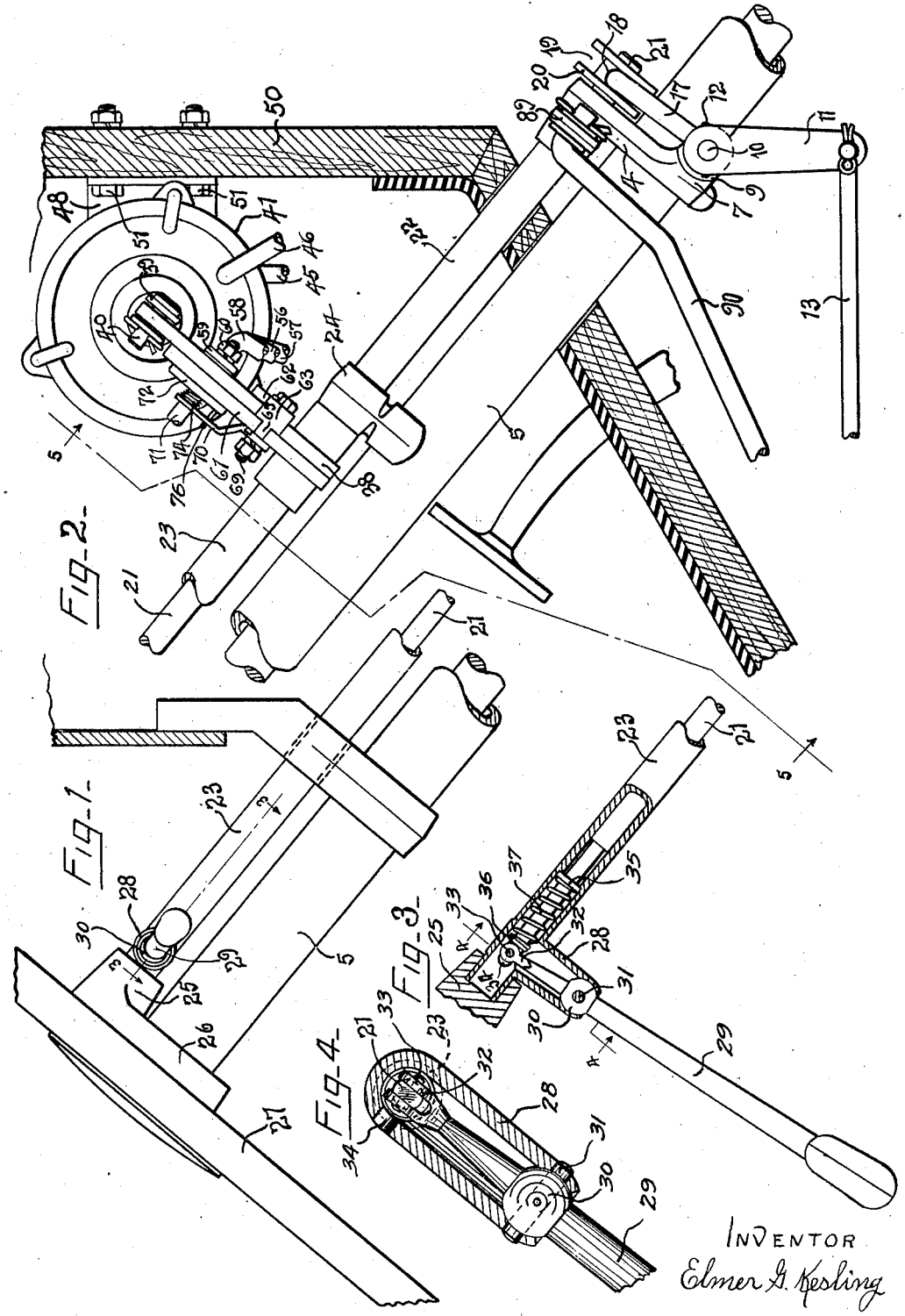
INVENTOR
Elmer G. Kesling

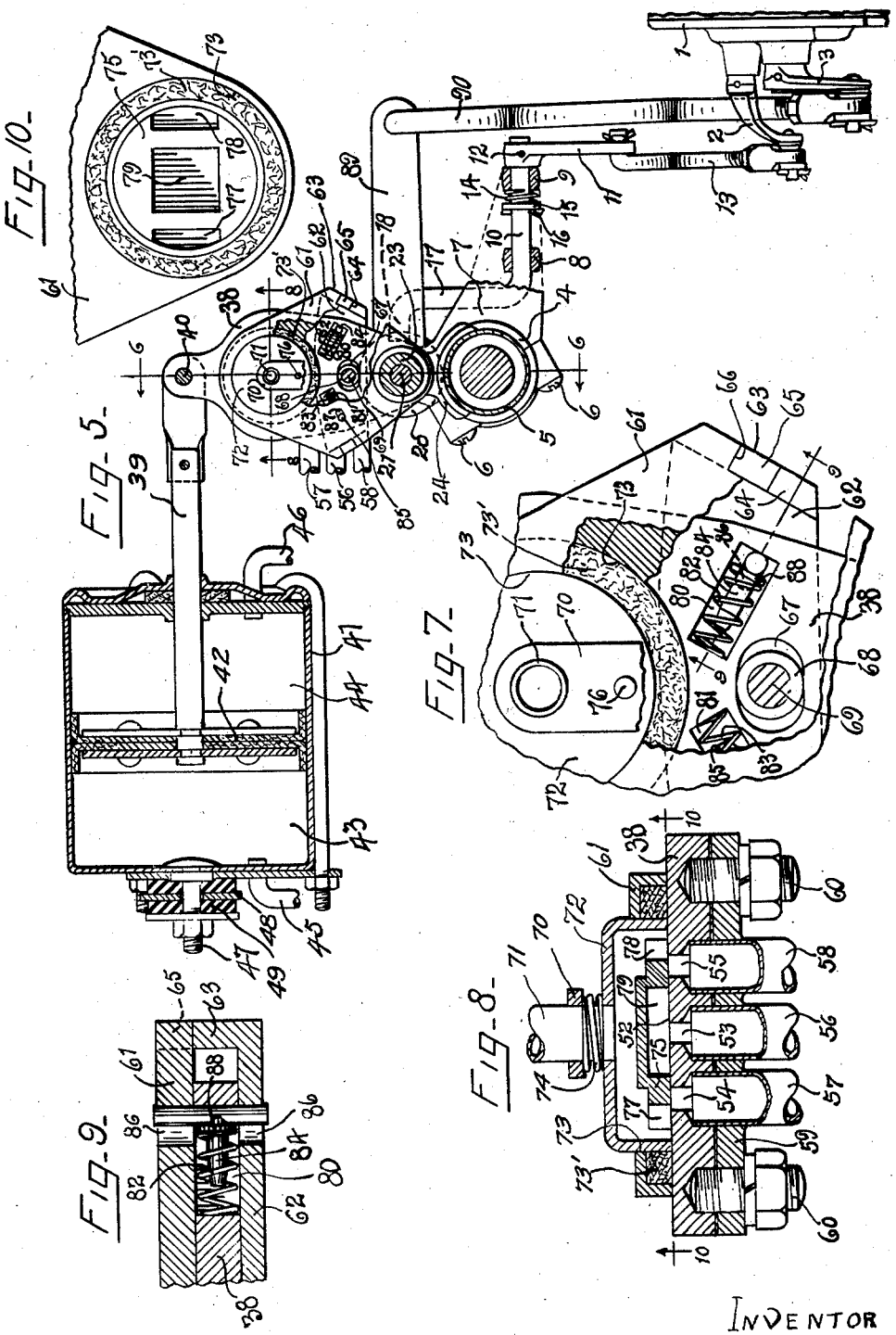

July 6, 1943.  E. G. KESLING  2,323,878
GEAR SHIFTING MECHANISM
Filed March 6, 1940  4 Sheets-Sheet 3
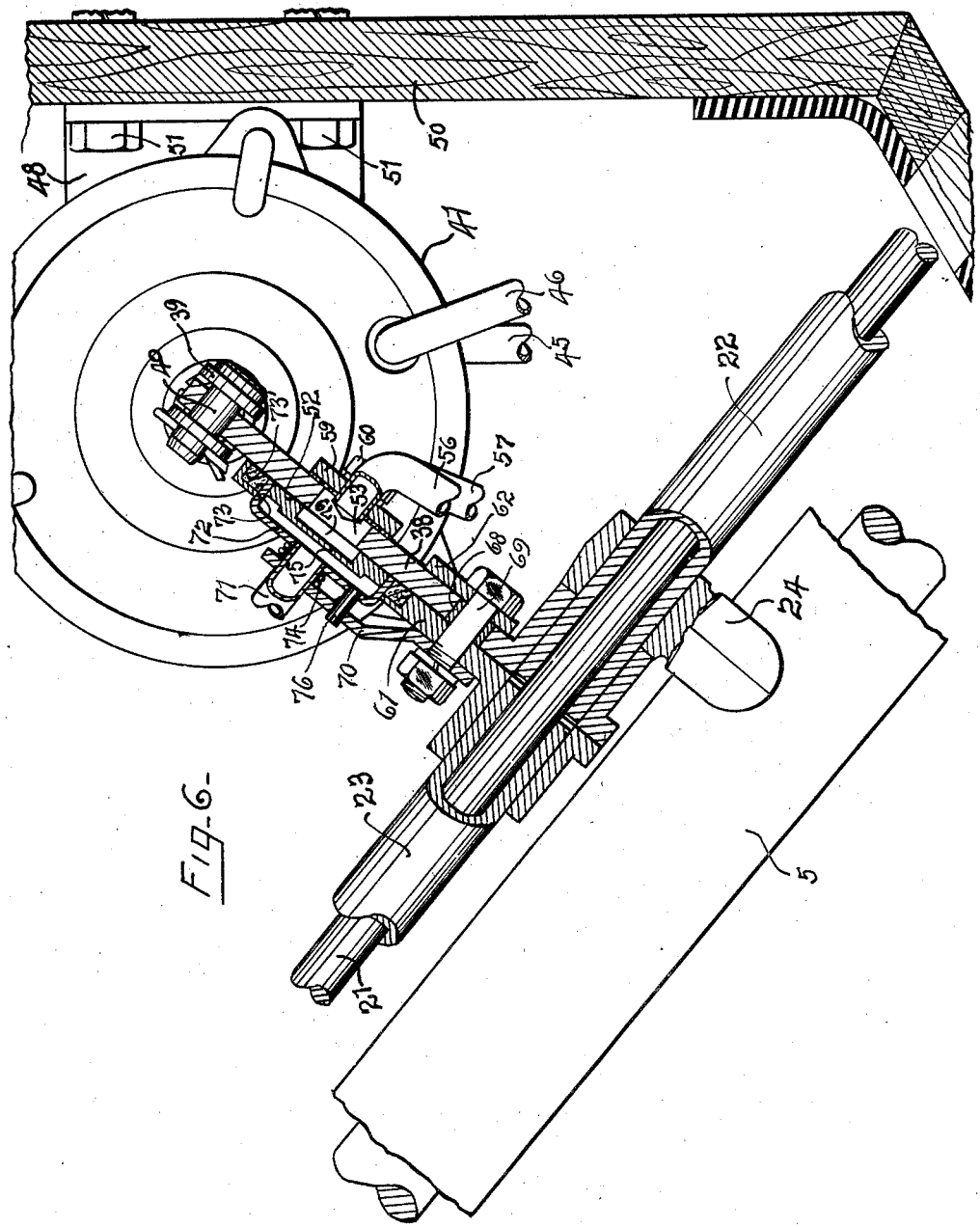
INVENTOR
Elmer G. Kesling July 6, 1943.　　　　E. G. KESLING　　　　2,323,878
GEAR SHIFTING MECHANISM
Filed March 6, 1940　　　　4 Sheets--Sheet 4
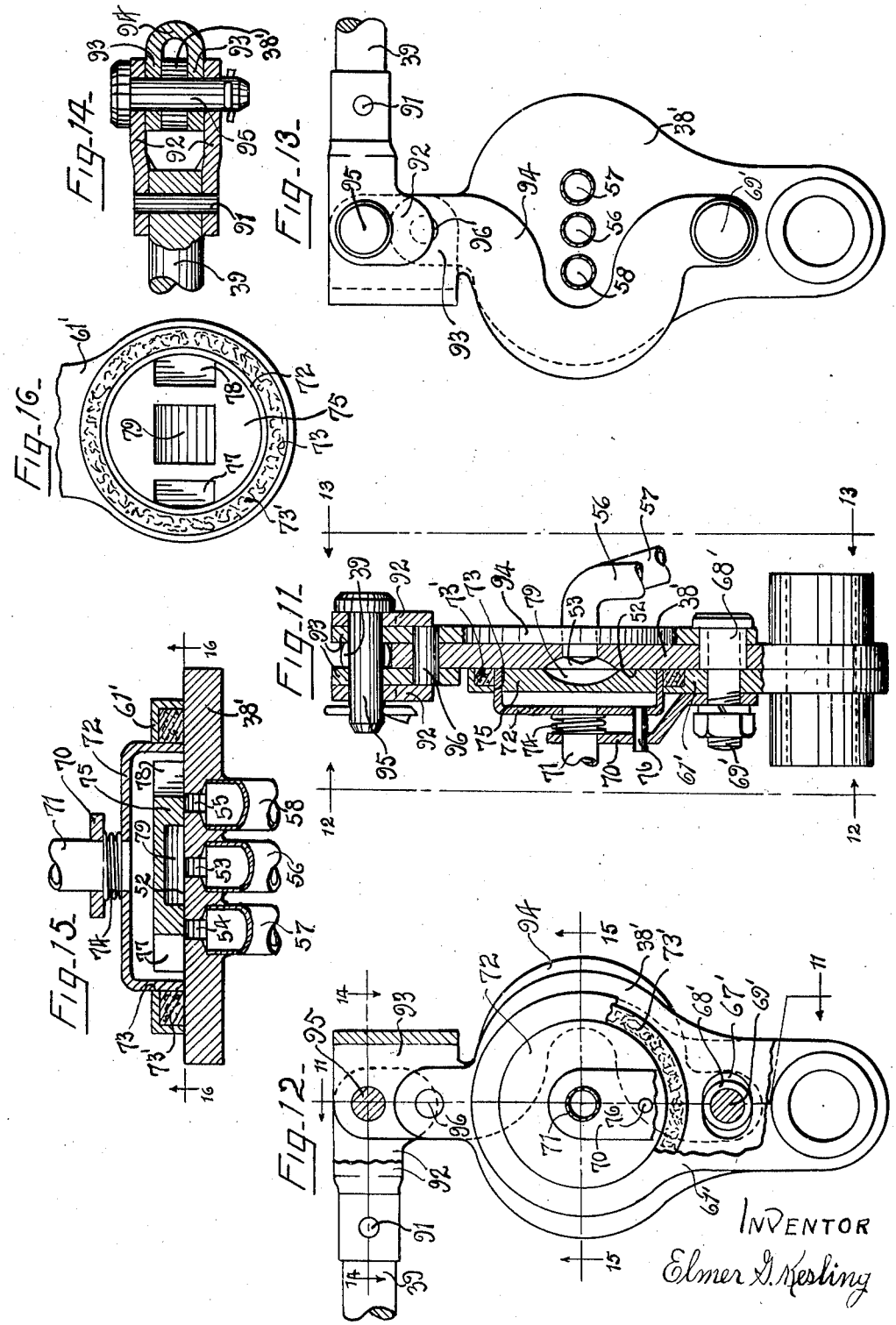

Patented July 6, 1943

2,323,878

UNITED STATES PATENT OFFICE 2,323,878

GEAR SHIFTING MECHANISM

Elmer G. Kesling, Bloomfield, Mo.

Application March 6, 1940, Serial No. 322,563

19 Claims. (Cl. 74—335)

This invention relates to gear shifting mechanism, and has special utility as a selecting and shifting means for the transmission gearing of automobiles and other vehicles. The gear shifting mechanism used is of the type in which manual energy is applied to effect the selective movements preparatory for the shifting operations, after which manual and power energy may be applied independently or in combination to effect the shifting movements, and in which manual energy, resilient energy and power energy are utilized to regulate a valve for controlling the power energy, and also in which said manual energy may be utilized to effect either a definite proportion or any desired part of the shifting movements.

The present invention is an improvement in the gear shifting mechanism disclosed in my copending applications, Serial No. 195,865 and Serial No. 261,445.

Objects of the invention are to provide a gear shifting mechanism having selective shifter elements and an operating means utilizing manual force to select the element to be shifted and to open a valve against the action of a resilient means, said valve controlling energization of a power means which effects the shifting of the selected element and said resilient means acting automatically to close said valve when the manual force is released; to provide mechanism wherein a pair of springs are mounted under a partial compression for separate action in opposite directions to resiliently hold a valve in normally closed relation, said springs being respectively placed under further compression as said valve is opened in either direction by an operating force, and said further compression acting automatically to close said valve as said operating force is released; to provide mechanism wherein the valve for controlling energization of the power means is opened by manually moveable means and closed by said power means in a follow-up manner when said manually moveable means is stopped and held; to provide mechanism wherein the energization controlling valve is held normally closed automatically; to provide mechanism wherein the valve controlling energization of the power means is held normally closed by said power means; to provide mechanism wherein the manual means may be made to effect any elected amount of force for assisting the power means in the shifting movements; to provide mechanism wherein continued movement of the manual valve opening force will completely effect the shifting movements in case the power means fails to become energized, or will assist said power means in any required degree to effect said shifting movements in case said power means is insufficiently energized; to provide mechanism wherein manual force is utilized to initially move the shifting connections in opening the valve and thereafter effect a definite proportional part of the shifting movements while continuing to regulate said valve and while the power means effects the remaining proportional part of said shifting movements; to provide mechanism wherein the manual operating means has positive connection with the valve plate of the valve mechanism and lost-motion connection with the shifting means or actuator, while the shifting means or actuator and valve seat of the valve mechanism are positively connected to the power means; to provide a mechanism which is constructed principally of stampings and thereby producing a comparatively inexpensive device; to provide a mechanism which is very compact and easily assembled; and to provide a valve mechanism assembly that requires no adjusting for operation; to provide mechanism wherein the valve mechanism and power means are located under the cowl and out of direct exposure to the road dust.

Various other objects and advantages of the invention will be made apparent from the following description, reference being made to the annexed drawings, in which—

Fig. 1 is a side elevation of a part of the invention shown mounted on the upper part of the steering column of an automobile.

Fig. 2 is a side elevation of a part of the invention shown mounted on the lower part of the steering column and also attached to the dash of an automobile.

Fig. 3 is a sectional view approximately on the line 3—3 of Fig. 1.

Fig. 4 is a sectional view on the line 4—4 of Fig. 3.

Fig. 5 is a view partly in section approximately on the line 5—5 of Fig. 2, showing the operative connection of the invention to the transmission of an automobile.

Fig. 6 is a sectional view approximately on the line 6—6 of Fig. 5.

Fig. 7 is an enlarged view of part of the valve and adjacent mechanism as shown in Fig. 5.

Fig. 8 is a sectional view on the line 8—8 of Fig. 5.

Fig. 9 is a sectional view on the line 9—9 of Fig. 7.

Fig. 10 is a reduced view as seen from the plane of the line 10—10 of Fig. 8.

Fig. 11 is a sectional view on the line 11—11 of Fig. 12 of a modified form of the valve mechanism and means connecting the shafts 22 and 23.

Fig. 12 is a front elevation of the parts shown in Fig. 11 as viewed from the line 12—12 of Fig. 11, and with a portion of certain parts cut away.

Fig. 13 is a rear elevation of the parts shown in Fig. 11 or viewed from the line 13—13 of Fig. 11.

Fig. 14 is a sectional view on the line 14—14 of Fig. 12.

Fig. 15 is an enlarged sectional view on the line 15—15 of Fig. 12.

Fig. 16 is a reduced view as seen from the plane 16—16 of Fig. 15.

The case 1 (Fig. 5) encloses the customary transmission gearing (not shown). The present invention is not concerned with the construction of the gearing that is within the case 1, except that it is to be understood that they are of the shifter element type for effecting the different speed relations. In the showing of the drawings, selection of the element to be shifted is effected by the position of the crank 2; and the shifting of the selected element is effected by the operating of the crank 3, as respectively hereinafter set forth.

A bracket 4 is adjustably secured to the lower end of the steering column jacket 5 by screw 6 and has a lateral projection 7 with bearings 8 and 9 formed on one side thereof. A shaft 10 is mounted for rotation in said bearings 8 and 9 and has a crank arm 11 secured to the outer end thereof by a pin 12. A link 13 pivotally connects the cranks 11 and 2. A spring 14, washer 15 and cotter pin 16 are so mounted on the shaft 10 to hold the hub of the crank arm 11 against the outer end of the bearing 9 and prevent longitudinal movement of the shaft 10. The inner end of the shaft 10 is bent to form a crank 17 with the end 18 engaging a circumferential groove 19 in a part 20 which is secured in any desirable manner to the lower end of a selector shaft 21 which is mounted for rocking and longitudinal movements in a tubular actuating shaft 22 and in a tubular operating shaft 23. Said actuating shaft 22 being mounted for rotative movements only in a bearing formed in the bracket 4 and in a bearing 24 secured at the required point to the jacket 5 in any desirable manner. Said operating shaft 23 is held in axial alignment at the lower end with the actuating shaft 22 by the shaft 21 and is supported for rotative movements only at the upper end in a bearing 25 formed integral with a member 26 which is secured to the jacket 5 just under the steering wheel 27 in any suitable manner.

The operating shaft 23 has a tubular lateral projection 28 adjacent the bearing 25 which pivotally supports an operating lever 29 by a ball formation 30 and pin 31.

The end of the lever 29 within the projection 28 terminates in a forked formation 32 which is pivotally connected to the upper end of the selector shaft 21 by a pin 33 in assembly which may be inserted through a hole 34 in the wall of the tubular operating shaft 23. Said pin 33 may be spot welded or otherwise secured to the fork 32. The upper end of the tubular operating shaft 23 is reamed out to the desired distance to form a support for a washer 35 through which the shaft 21 freely passes. A second washer 36 is mounted on the shaft 21 just under the fork 32 for abutment against the ears of the same. A normally compressed spring 37 is mounted on the shaft 21 between the washers 25 and 36.

In the selective operation of the device, it is now plainly seen that the spring 37 normally holds the shaft 21 in an upward longitudinal position. This action through the parts 21, 18, 17, 10, 12, 11 and 13 normally holds the crank arm 2 (Fig. 5) in a forward position which position selectively engages the shifter elements for shifting into high or intermediate speed positions; and it is also plainly seen that if the lever 29 were raised the pivotal action on the pin 31 would move the shaft 21 longitudinally downward against the resilient action of the spring 37, which action through the parts 21, 18, 17, etc., would move the crank arm 2 to the rearward position which position selectively engages the shifter elements for shifting into low and reverse speed positions.

A crank arm 38 is secured by welding or otherwise to the projecting end of the shaft 22 beyond the bearing 24. The free end of the arm 38 is pivotally secured to one end of a piston rod 39 by a pin 40. The other end of the rod 39 extends through one end wall of a cylinder 41 and is secured in any known manner to a piston 42 which divides the cylinder 41 into two chambers 43 and 44. Tubes 45 and 46 are secured in the wall of the cylinder 41 and communicate with the chamber 43 and 44, respectively. A pin or bolt 47 is secured to the other end wall of the cylinder 41 and affords a pivotal connection to a supporting bracket 48 by the use of a rubber mounting 49. The bracket 48 may be secured to the dash 50 by bolts 51 or to any convenient stationary part of the automobile.

The piston 42, piston rod 39 etc. are to be known as the power device of this invention. A portion of one side of the arm 38 forms a valve seat 52 which has a passage 53 and ports 54 and 55 therethrough (Fig. 8). Tubes 56, 57 and 58 are secured by a plate 59 and bolts 60 to the other side of the arm 38, said tubes communicate with the passage 53 and ports 54 and 55, respectively.

A crank arm 61 is secured by welding or otherwise to the lower end of the shaft 23. The adjacent surfaces of the arms 38 and 61 are to be parallel for free relative movements therebetween. One or both of the adjacent ends of the hubs of the arms 38 and 61 are to be formed with a slight fullness so as to reduce the surface friction between the arms 38 and 61.

A plate 62 contacting a certain portion of the surface of the arm 38 opposite to the arm 61 has a bent portion 63 at each end which is formed with abutment faces 64 for contacting the adjacent surface of the arm 61 and a projection 65 for snug engagement in a notch 66 formed in the respective edge of the arm 61. An elongated slot 67 is formed through the arm 38 at a required distance from the shaft 22. A spacing tube 68 is mounted in the slot 67. The arm 61 and plate 62 are held in rigid contact with the respective end of the tube 68 by a bolt 69 which is inserted through the tube 68 and corresponding holes in the arm 61 and the plate 62. The tube 68 and the bent portions 63 are of such length as to leave the arm 38 free to move between the arm 61 and the plate 62 (Fig. 6). The slot 67, tube 68 and bolt 69 form a lost-motion connection between the arm 61 and the arm 38 for limiting relative rotative movements between the operating shaft 23 and the actuating shaft 22; and the tube 68 and bolt 69 etc. comprises means for positive simultaneous longitudinal movements of the shafts 22 and 23.

The plate 62 is of such length that the bent portions 63 will not be contacted by the respective edge of the arm 61 in the movements permitted by the lost-motion connection 67—69.

A clip 70 is secured at one end to the arm 61 by the bolt 69 and is bent away from the arm 61 and extended into spaced relation with the valve seat 52, and a hole is provided in the free end of the clip 70 through which a tube 71 projects.

A cup-like cover 72 with its edge in contact with the valve seat 52 is mounted in a hole 73 provided in the free end of the arm 61. The inner end of the tube 71 is secured in the dome surface of the cover 72 for communication with the inside thereof. The cover 72 is held in contact with the valve seat 52 by the resiliency of a spring 74 mounted around the tube 71 between the cover 72 and the adjacent surface of the clip 70. A required portion of the hole 73 is enlarged to form a circular recess in the arm 61 for the reception of an oil and dust gasket 73' of felt or other suitable material. The cover 72 forms a moveable valve chest which both houses and actuates a valve plate 75 which may be spot welded, or otherwise secured, to the cover 72. The cover 72 and plate 75 are prevented from turning in the hole 73 by a pin 76 which is freely mounted in a hole in the clip 70 and secured to the cover 72 by welding or otherwise. The periphery of the valve plate 75 is formed to contact the inner surface of the cover 72 except where it is cut away to form passages 77 and 78 (Fig. 10 and Fig. 8) to allow fluid energy to flow between the tube 71 and the port 54 or the port 55, as the case may be. A passage 79 is formed on the under side of the valve plate 75 to allow fluid energy to flow between the passage 53 and the port 54 or the port 55, as the case may be.

The valve seat 52 having passage 53 and ports 54 and 55, and the valve plate 75 together with the cover 72, etc., form the valve mechanism of this invention.

Regulation of the valve mechanism is either effected by turning movements of the shaft 23 which through the arm 61 and the cover 72 causes the valve plate 75 to move relative to the valve seat 52, or by turning movements of the shaft 22 which through the arm 38 causes the valve seat 52 to move relative to the valve plate 75. It is then clearly seen that if the shafts 22 and 23 should be held still or turned together any given relative position between the valve 75 and the seat 52 will be maintained. It can here be noted the limit of movements of the lost-motion connection 67—69 is such as to allow a complete opening of the valve 75 in either direction.

Rectangular slots 80 and 81 are formed at suitable locations through the arm 38 for the reception of respective valve closing springs 82 and 83 which are reposed on T piece 84 and 85, respectively, with the cross arm of each T piece normally engaging one end wall of the respective slot, and springs 82 and 83 mounted under a partial compression between the other end wall of said respective slot and the cross arm of said T piece, and with the extended arms of the T pieces 84 and 85 projecting into respective holes or slots 86 and 87 provided through the arm 61 on the one side and the plate 62 on the other side. The slots 80 and 81 are so placed that the line of action of the springs 82 and 83 is substantially at right angles to the swinging pivotal movements of the arms 38 and 61. A washer or integral formation 88, as shown, may be positioned between each T piece 84 and 85 and the respective springs 82 and 83 in order to give said spring a better abutting surface at that end. The holes or slots 86 and 87 are of such position that the arm 61 and plate 62 normally contact the side of the T piece cross arms opposite the respective springs 82 and 83, and the holes 86 and 87 or slots are of such size or length that should force be applied in a manner to effect pivotal movements of the arm 61 in either direction, the respective T piece 84 or 85 will be moved to further compress one of the springs 82 or 83, as required, while the other of said springs 82 or 83, as the case may be, will be left in its normally compressed condition. It is clear that should said force be relieved the further compressed spring 82 or 83, as the case may be, will act to automatically return the arms 61 and 38 to normal relative relation. It is also understood that the holes or slots 86 and 87 are of such size or length to permit the full limits of movements of the lost-motion connection 67—69.

It will be noted that the construction and arrangement of the parts 80 to 88, inclusive, forms an automatic resilient valve closing means, and also a means comprising a definite resilient force for normally holding said valve 75 in a closed relation.

It is now apparent that any swinging movement of the arm 61 from the normal central relation with the arm 38 by a turning movement of the shaft 23 to open the valve 75 will be against the resilient action of the further compressed spring 82 or 83, as the case may be, and that as the force utilized to swing the arm 61 is released the thus further compressed spring 82 or 83 will automatically return the arm 61 to normal relative relation with the arm 38 and thus close the valve 75.

A crank arm 89 is mounted on the lower end of the shaft 22 adjacent the bearing 4 and is secured to the shaft 22 in any desirable manner. One end of a link 90 is pivotally connected to the free end of the crank arm 89, and the other end of the link 90 is pivotally connected to the crank 3.

It will be understood that rubber tubing or other flexible means (not shown) is to be used to transmit the fluid energy employed to and from the tubular connections shown. If vacuum air is to be used, such flexible means would connect the tube 56 to the engine intake manifold (not shown), the tube 57 to the tube 45 and the tube 58 to the tube 46, while the tube 71 would simply open to the atmosphere directly or indirectly through an air cleaning device (not shown). If a pressure medium is to be used, the connections of the tubes 57 and 58 to the tube 45 and 46, respectively, would remain the same as for vacuum air; but the tube 71 would be connected to a pressure device (not shown), while the tube 56 would simply open to the atmosphere directly or indirectly through a muffling device (not shown). This connecting means must be flexible because the connections are to parts that have movement in the operation of the invention.

In the construction of the modification shown in Figs. 11 to 16, inclusive, the parts 80 to 88, inclusive, are omitted, and the piston rod 39 is rigidly secured by a pin 91, or otherwise, to ears 92 which embrace two side parts 93 of one end of an equalizer lever 94 and pivotally connected thereto by a pin 95, while the free end of the arm 38' is placed between the side parts 93 and pivotally connected thereto by a pin 96. The ears 92 are so formed to always engage the ends of the pin 96 to prevent dislodgement of the same. The other end of lever 94 is pivotally connected to the arm 61' at a point near the hub of the arm 61' by the bolt 69'. The bolt 69' passes through a tube 68'. The tube 68' passes through a free fitting hole in the lever 94 and through a lost-motion slot 67' in the arm 61' and is of such length as to leave the arm 38' and lever 94 free from surface friction. The functions of the parts 67', 68' and 69' are the same as the parts 67, 68 and 69 of the form of this invention shown in Figs. 1 to 10, inclusive, with the added feature of pivotally connecting the lever 94 to the arm 61'. The arms 38' and 61' are secured to the shafts 22 and 23, respectively, the same as in Figs. 1 to 10, inclusive.

In the modification shown in Figs. 11 to 16, inclusive, the parts 59 and 60 are omitted and the tubes 56, 57 and 58 are directly secured by solder or otherwise to the arm 38' to function in the same manner as shown in Figs. 1 to 10.

The bolt 69' passes through one end and secures the strap 70 to the arm 61'.

In the modification the passages 53 and 79 and the parts 54 and 55 are shown formed with a milling cutter, but function the same as shown in Figs. 1 to 10. All other parts of the valve mechanism are the same as shown in Figs. 1 to 10.

After the required selection is or has been made, as explained heretofore, the operating lever 29 is swung in a horizontal plane to effect the required shift through the action of the parts 31, 28, 23, 61, 72, 75, the openings 53, 54, 55, 77, 78, the proper tubing, and the parts 41, 42, 39, 40, 38, 22, 89, 90 and 3, which swing the crank 3 backward or forward as the case may be. When the lever 29 is swung forwardly these parts etc. act in one direction to swing the crank 3 forwardly to effect either reverse or intermediate speed position, as the case may be; and when the lever 29 is swung rearwardly these parts etc. act in an opposite direction to swing the crank 3 rearwardly to effect either low or high speed position, as the case may be.

Therefore, if it is desired to shift into either reverse or low speed, the lever 29 is raised; and, since the lever 29 fulcrums in this plane of movement on the pin 31 in the projection 28 which is rigid with the shaft 23 which together with the axially aligned shaft 22 is held against longitudinal movements by the stationary parts 4 and 25, and also since the lever 29 extends beyond the fulcrum pin 31 to engage the shaft 21 by the fork 32 and pin 33, the shaft 21 and part 20, etc., are made to move longitudinally downward against the resilient action of the spring 37; whereby the double end bell crank device 18, 17, 10, 11, etc. is turned in a direction to move the link 13 rearwardly and thereby swing the arm 2 in the same direction to position the selecting means into the required relation for shifting the shifter elements into either reverse or low speed position; then, if it is desired to shift into reverse speed, the lever 29 is swung forwardly which movement through the action of the pin 31 and projection 28 causes the shaft 23 to turn in the same direction and the arm 61 which is rigid with the shaft 23 swings in the same direction, against the resilient action of the spring 82, and moves the cover 72 and valve 75 therewith to open the ports 54 and 55; whereupon if vacuum energy is used, the air will be depleted from the chamber 43 through the tube 45—57, port 54, passage 53, and tube 56; and, thereupon, atmospheric air will rush through the tube 71, port 55, and tube 58—46 into the chamber 44 and move the piston 42 to the left (Fig. 5) in the cylinder 41, and swing the crank arm 38 to the left, causing the shaft 22 to turn in the same direction whereby the crank arm 89 will raise and cause the link 90 to move bodily forward and swing the crank arm 3 in the same direction to effect the shift into reverse speed position.

It is to be noted that this shifting action has been effected by the power means 42, 39, etc., in a follow-up manner, since manual means 29, etc. has initially moved the valve 75 ahead while the power means has subsequently moved the valve seat 52 in a follow-up manner.

Therefore, it is obvious that this shifting movement continues as the operator continues to move the lever 29, and keeps the valve 75 ahead of the ports 54 and 55, and the acting power means 42, will continue to move the valve seat 52 in the same direction; but, if the operator should release the lever 29, the spring 82 will automatically act to close the valve 75 and the power means 42, etc., would stop; or, if the operator should stop the movement of the lever 29 and stay the valve 75, the acting power means 42, etc., will continue to move the valve seat 52 in a follow-up manner and cause the ports 54 and 55 to over-run the valve 75, whereupon the power means will also stop.

To bring the parts from reverse speed position to neutral position, the parts will act in the opposite direction to that of shifting into reverse speed position, except the other spring 83 will be further compressed as the valve 75 is moved in the opposite direction to open the ports 54 and 55; whereupon the air in the chamber 44 is depleted by said vacuum through the tube 58—46, port 55, passage 53 and tube 56; and thereupon atmospheric air will rush through tube 71, port 54 and tube 57—45 into chamber 43 and move the piston 42 toward the right of the cylinder 41, and the connected parts, acting in the said opposite direction, effect the shift into neutral position.

The action of shifting from neutral position to low speed position is the same as shifting from reverse speed position to neutral position; and the action of returning the parts to neutral position from low speed position is the same as shifting from neutral to reverse speed position.

To shift into either intermediate or high speed position, the lever is lowered, normally automatically by the spring 37 when the parts are in neutral position, which movement, whether manual or by said resilient means 37, through the connected parts 32, 33, etc., effects a longitudinally upward movement of the shaft 21, part 21, etc.; whereby the double end bell crank device 18, 17, 10, 11, etc., is turned in a direction to move the link 13 longitudinally forward, and thereby swing the arm 2 in the same direction to position the selecting means into the required relation for shifting the shifter elements into either intermediate or high speed position; whereupon to effect the shift into intermediate speed position, the lever 29 is swung forwardly and the action of all parts is the same as for shifting into reverse speed position.

To bring the parts from intermediate speed position to neutral position and to high speed position, all parts are moved in the opposite direction to that of effecting the shift into intermediate speed position; and the action to bring the parts to neutral from high speed position is the same as that to shift into intermediate speed position.

It is intended that the customary interlock and spring plungers (not shown) are to be used respectively, to prevent simultaneous shifting of the unselected elements from being shifted.

If the power energy is not sufficient to effect the shift, or if no power energy is available, manual force may be utilized to assist or completely effect the shifting movements, respectively.

Selection is always effected manually in the manner described, regardless of whether the shifting movements are to be effected by power means alone, by a combination of power and manual means, or by manual means alone. Manual action to shift or assist shifting is effected by the tube 68 or 68' either the front or the rear end, as the case may be, of the slot 67 of the form of this invention shown in Figs. 1 to 10, or the tube 68' engaging either the front or the rear end, as the case may be, of the slot 67.' of the modification shown in Figs. 11 to 16; whereupon, a continued manual movement of the lever 29, 23, etc., in the same direction will swing the crank arm 38 or 38' in the same direction and cause the connected parts 22, etc., to effect the shift selected as disclosed in describing the power shifting movements.

It is also obvious that the manual force applied to open the valve 75 against the resilient action of the automatic valve closing springs 82 or 83, as the case may be, results in assisting the power means to effect the shift selected, because the further compressed one of the said springs 82 or 83 acts to move the crank arm 38 in the same direction.

The selecting and shifting operations utilizing the modification shown in Figs. 11 to 16 are accomplished in the same manner as in the form shown in Figs. 1 to 10, inclusive, except as to the action of the lever 94 which functions as an equalizer and a floating lever; and, since the lever 94 is an equalizer of the forces between the manual means and the power means in effecting the shifting movements, it becomes a part of the actuator. The equalizing action is to the effect that the force required by manual means and by power means is in indirect proportion to the length of the respective ends of the equalizer, whereby the manual means will furnish a definitely smaller proportion of the force required to effect the shifting movements, while the power means will furnish the remaining definitely larger proportion of the force required to effect the shifting movements. An exception to this proportion of forces will occur when the tube 68 or 68' engages one or the other end of the slot 67 or 67', and the manual force applied will further assist the power means to effect the shifting movements; and this amount of assistance will increase or decrease in accordance with the efficiency of the power means, to the end that if the power means should completely fail the manual means will effect the entire shifting movement. The lever 94 will act as a floating lever when the operating manual valve opening force is released; whereupon the acting power means will effect a reverse swinging movement of the floating lever 94 and thereby close the ports 54 and 55 by a reversed movement of the valve 75; and also the power means 42, etc., will function normally to hold the valve 75 in a closed relation through the lever 94 acting as a floating lever. In these floating-lever actions, the pin 96 acts as a fulcrum for the swinging movements of the lever 94. It can then be seen that in the operation of this modification, the manual means 29, etc., initially opens the valve 75 and the power means, 42, etc., finally closed the valve. This valve closing may be accomplished in either one of two ways: first, by the valve plate 75 being held stationary by the manual means 29, etc., while the power means moves the valve seat 52 to overrun the valve plate 75 in a follow-up manner; or, second, by the power means moving the valve plate 75 in a return direction through the action of the floating-lever pivoting on the pin 96. Therefore, the manual means initially acts to initially regulate the valve and also to initially move the actuator, or at least a part of the actuator, and the power means subsequently assists the manual means to effect the movement of the actuator and also to subsequently close the valve in either a follow-up manner or a reversed manner.

For convenience of description, the valve seat 52 and the valve slide 75 may be referred to as the valve element 52 and the valve element 75.

It must now be apparent that my invention obtains all the intended objects in a highly efficient manner. Obviously, the construction, arrangement and relationship of the parts may be varied within the scope of equivalent limits without departure from the nature and principle of the invention. I do not restrict myself specifically otherwise than as set forth in the appended claims, nor do I restrict myself unessentially in any respects.

I claim:

1. Gear shifting mechanism of the character described comprising shifter elements, selector means for selecting the element to be shifted, a shaft, a second shaft, both of said shafts mounted for rocking movements only for shifting the selected element, means connecting said shafts for limited relative rotative movements, a manual means connected to said second shaft for manually operating said shafts, a power device, and means mounted on said connecting means controlling said power device for assisting said manual means in operating said first named shaft.

2. Gear shifting mechanism of the character described comprising shifter elements, a selector device for selecting the element to be shifted, an actuator mounted for rocking movements only and connected in a manner for shifting the selected element, a shaft mounted for rocking movements only for rocking said actuator, means including a lost-motion device connecting said shaft and said actuator, a manually operated device connected to said selector device and to said shaft for operating said selector device and thereafter turning said shaft and thereby said actuator, a power device connected to said actuator, and a valve assembly mounted on said means controlling said power device for assisting said manual device in effecting said shifting movements.

3. Gear shifting mechanism of the character described comprising shifter elements, selector means for selecting the element to be shifted, an actuator mounted for turning movements only and including means for effecting the shifting of the selected element, a crank arm attached to said actuator, a power device for imparting turning movements to said actuator, a shaft mounted for turning movements only and in axial alignment with said actuator, a valve element mounted on said crank arm, a second valve element mounted upon and moveable relative to said crank arm for controlling energization of said power device, means operatively connecting said shaft and said actuator and including means for regulating said valve, and operating means connected for operating said selector means and said shaft.

4. Gear shifting mechanism of the character described comprising shifter elements, selector means for selecting the element to be shifted, actuating means including a shaft mounted for turning movements only and having connections for shifting the selected element, a power device for operating said actuating means, a second shaft mounted for turning movements only and in axial alignment with said first named shaft, crank arms connected to said shafts respectively, means limiting relative turning movements of said shafts, a valve means mounted on said crank arms for movements to control energization of said power device, and manual operating means for operating said selector means and also said second named shaft to regulate said valve.

5. Gear shifting mechanism of the character described comprising shifter elements, selector means for selecting the element to be shifted, actuating means including a shaft mounted for turning movements only and having connections for shifting the selected element, a power device for operating said actuating means, a second shaft mounted for turning movements only and in axial alignment with said first named shaft, crank arms connected to said shafts respectively, means limiting relative turning movements of said shafts, a valve means mounted on said crank arms for movements to control energization of said power device, and manual operating means for operating said selector means and also said second named shaft to regulate said valve and thereafter for assisting said power device to operate said actuating means.

6. Gear shifting mechanism of the character described comprising shifter elements, selector means for selecting the element to be shifted, a pair of shafts mounted in end-to-end alignment for turning movements only for shifting the selected element, means providing limited relative turning movements of said shafts, manual means connected to one of said shafts for manually operating said shafts, and a power device connected to the other one of said shafts for assisting said manual means to shift the selected element.

7. Gear shifting mechanism of the character described comprising shifter elements, selector means for selecting the element to be shifted, a pair of shafts mounted in axial alignment for turning movements only for shifting the selected element, connecting means for said shafts including means providing limited relative turning movements of said shafts, a power device connected to one of said shafts for shifting the selected element, a valve supported by said connecting means and moveable to control energization of said power device, and manual means connected to said selector means and to the other one of said shafts for operating said selector means and thereafter regulating said valve by said other shaft and finally assisting said power device to shift the selected element.

8. Gear shifting mechanism of the character described comprising shifter elements, selector means for selecting the element to be shifted, a pair of shafts mounted in axial alignment for turning movements only for shifting the selected element, connecting means for said shafts including means providing limited relative turning movements of said shafts, a power device connected to one of said shafts for shifting the selected element, a valve supported by said connecting means and moveable to control energization of said power device, and manual means connected to said selector means and to the other one of said shafts for operating said selector means and thereafter regulating said valve by said other shaft.

9. Gear shifting mechanism of the character described comprising shifter elements, selector means for selecting the element to be shifted, a shaft, a spindle, said shaft and said spindle being mounted in axial alignment for rotative movements only for shifting the selected element, means connecting said shaft and said spindle for limited relative rotative movements therebetween, a power device for rotating said spindle, a valve means mounted on said connecting means and opened and closed by said relative rotative movements to control said power device, means utilizing manual force to operate said shaft to open said valve, and other means connected to said power device for closing said valve by said power means when said manual force is released.

10. Gear shifting mechanism of the character described comprising shifter elements, selector means for selecting the element to be shifted, a spindle mounted for turning movements only to shift the selected element, a power device for imparting turning movements to said spindle, a valve for controlling energization of said power device, a shaft mounted for turning movements only and in axial alignment with said spindle, means connecting said shaft and said spindle and providing limited relative turning movements between said shaft and said spindle, and manual means for operating said selector means and thereafter turning said shaft to regulate said valve and finally when said limited relative turning movement has been attained to continue to turn said shaft to manually assist said power device to impart turning movements to said spindle and shift the selected element.

11. Gear shifting mechanism of the character described comprising shifter elements, selector means for selecting the element to be shifted, an actuator shaft mounted for turning movements for shifting the selected element, a control shaft mounted for turning movements only and in axial alignment with said actuator shaft, means providing a lost-motion connection between said control shaft and said actuator shaft, manually operated means connected to said selector means and to said control shaft for effecting the selection by said selector means; and thereafter manually operating said control shaft to turn said actuator shaft, and a power device connected to said actuator shaft and controlled by said control shaft for assisting in effecting said shifting movements.

12. Gear shifting mechanism of the character described comprising shifter elements, selector means for selecting the element to be shifted, an actuator shaft mounted for turning movements for shifting the selected element, a control shaft mounted for turning movements only and in end-to-end alignment with said actuator shaft, means providing a lost-motion connection between said control shaft and said actuator shaft, a power device connected to said actuator shaft and controlled by said control shaft for effecting said shifting movements, and manually operated means connected to said selector means and to said control shaft for effecting the selection by said selector means and thereafter manually operating said control shaft to initially control said power device and finally assist said power device in effecting said shifting movements.

13. Gear shifting mechanism of the character described comprising shifter elements, selector means for selecting the element to be shifted, an actuator mounted for turning movements only for shifting the selected element, a crank arm attached to said actuator, a power device for turning said crank arm and actuator as desired, a valve mechanism for controlling energization of said power device having one element supported by said crank arm and positively movable therewith and a second element supported by said crank arm and relatively movable thereto for regulating said valve mechanism, a shaft mounted for turning movements only and in axial alignment with said actuator, a crank member attached to said shaft for moving said second valve element as aforesaid, and operating means for operating said selector means and for turning said shaft.

14. Gear shifting mechanism of the character described comprising shifter elements, selector means for selecting the element to be shifted, an actuator mounted for turning movements only for shifting the selected element, a crank arm attached to said actuator, a power device for turning said crank arm and actuator as desired, a valve mechanism for controlling energization of said power device having one element supported by said crank arm and positively movable therewith and a second element supported by said crank arm and relatively movable thereto for regulating said valve mechanism, a shaft mounted for turning movements only and in axial alignment with said actuator, a crank member attached to said shaft for moving said second valve element as aforesaid, means limiting relative movements between said crank arm and said crank member, and operating means for operating said selector means and for initially turning said shaft to regulate said valve and finally to assist said power device in turning said actuator.

15. Gear shifting mechanism of the character described comprising shifter elements, selector means for selecting the element to be shifted, an actuator mounted for turning movements only for shifting the selected element, a crank arm attached to said actuator, a power device connected for turning said crank arm and actuator as desired, a shaft mounted for turning movements only and in axial alignment with said actuator, crank means attached to said shaft, resilient means mounted under partial compression on said crank arm, a valve mounted on said crank arm and relatively moveable thereto by said crank means to open said valve for controlling energization of said power device, means cooperating with said crank means to further compress said resilient means as said valve is opened, and operating means connected to said shaft for operating said selector means and for opening said valve and therein further compress said resilient means.

16. Gear shifting mechanism of the character described comprising shifter elements, selector means for selecting the element to be shifted, an actuator mounted for turning movements only for shifting the selected element, a crank arm attached to said actuator, a power device connected for turning said crank arm and actuator as desired, a shaft mounted for turning movements only and in axial alignment with said actuator, crank means attached to said shaft, resilient means mounted under partial compression on said crank arm, a valve mounted on said crank arm and relatively moveable thereto by said crank means to open said valve for controlling energization of said power device, means cooperating with said crank means to further compress said resilient means as said valve is opened, and operating means connected to said shaft for operating said selector means and for opening said valve and therein further compress said resilient means, said further compression automatically reacting to close said valve when and as said operating means is released.

17. Gear shifting mechanism of the character described comprising shifter elements, selector means for selecting the element to be shifted, an actuator including a crank arm mounted for turning movements only for shifting the selected element, a shaft mounted for turning movements only and in end-to-end relation with said actuator, crank means attached to said shaft, a power device for turning said crank arm and actuator as desired, a valve mounted on said crank arm and relatively moveable thereto by said crank means for opening said valve to control energization of said power device, a pair of opposite acting springs mounted on said crank arm under a limited expansion for normally holding said valve in a closed position, means cooperating with said crank means for further compressing said springs, and operating means connected to said shaft for operating said selector means and for opening said valve in one direction or the other as desired and effecting further compression of the respective spring, said further compression automatically reacting to close said valve when and as said operating means is released.

18. Gear shifting mechanism of the character described comprising shifter elements, selector means for selecting the element to be shifted, a pair of shafts mounted on said selector means for turning movements only, means connecting said shafts for limited relative rotative movements, a power device controlled by said relative movements and connected to one of said shafts for turning the same to shift the selected element, and a manual device connected to said selector means for operating the same and to the other one of said shafts for turning the same to control said power device.

19. Gear shifting mechanism of the character described comprising shifter elements, selector means for selecting the element to be shifted, a pair of shafts mounted on said selector means for turning movements only, means connecting said shafts for limited relative rotative movements, a power device controlled by said relative movements and connected to one of said shafts for turning the same to shift the selected element, and a manual device connected to said selector means for operating the same and to the other one of said shafts for turning the same to control said power device and thereafter assist said power device in effecting said shifting movement.

ELMER G. KESLING.